United States Patent [19]
Donkin et al.

[11] 4,039,762
[45] Aug. 2, 1977

[54] KEY TELEPHONE OFF-PREMISES LINE CIRCUIT

[75] Inventors: Albert Edward Donkin, Oakhurst; David Frederick Jones, Middletown; Henry Alfons Lanty, Freehold, all of N.J.

[73] Assignee: Bell Telephone Laboratories, Incorporated, Murray Hill, N.J.

[21] Appl. No.: 608,502

[22] Filed: Aug. 28, 1975

[51] Int. Cl.² .............................................. H04M 1/72
[52] U.S. Cl. ...................................................... 179/99
[58] Field of Search ................... 179/18 AD, 18 B, 99

[56] References Cited
U.S. PATENT DOCUMENTS 3,758,729  9/1973  Everhart ................................ 179/99

Primary Examiner—Kathleen H. Claffy
Assistant Examiner—Randall P. Myers
Attorney, Agent, or Firm—David H. Tannenbaum

[57] ABSTRACT

An off-premises line circuit is disclosed which allows two telephone stations separated by a distance greater than lamp range to share a common central office or PBX line. Lamp signals as well as hold release commands are exchanged between stations by a signaling pair of leads. The off-premises line circuit is arranged so that either station may release the hold condition without regard as to which station established that condition.

12 Claims, 3 Drawing Figures

KEY TELEPHONE OFF-PREMISES LINE CIRCUIT

FIELD OF THE INVENTION

This invention relates to telephone systems and, more particularly, to a circuit arrangement whereby two telephone stations, separated by large distances, may both be connected to the same line and may both have control capability of that line.

BACKGROUND OF THE INVENTION

Presently, when more than one telephone station has access to the same telephone line and where it is desired that each station have the capability of placing a connection in the hold mode, a line circuit is used to control the telephone connections. Such arrangements are commonly called key telephone systems and the line circuit, or key telephone unit, is used to provide visual and audio indications of the condition of the telephone line as well as to control the hold function.

Typically, a single line circuit is interposed in the telephone line between the central office or PBX switching machine and the station, and arranged to serve as many telephone stations as it is desired to be connected to the same line. However, a problem develops in situations where two telephone stations, separated by large distances, are to share a common line. This problem is manifest in that under such a condition the resistance of the line connecting the two remote stations is such that an excessive voltage drop occurs, preventing the proper operation of the lamp and hold control circuitry.

A further problem is that circuitry added to the key telephone system must be done in a manner which does not require extensive modification to the existing telephone layout. This requirement stems from a desire to avoid the need for custom engineering each system, thereby maintaining the cost at a minimum level. In some prior art attempts to solve the problem, an auxiliary line circuit has been utilized to transmit signals to the far end for control purposes. These circuits, however, have required either extensive circuitry or access to the inner logic of the line circuit. In both of these situations major modifications to the telephone plant are required.

Thus, it is an object of my invention to provide a circuit usable in conjunction with existing circuits for providing lamp control and hold control functions at each of two remotely located stations without regard as to which station initiated the function and without requiring any changes to existing line circuits, to their interconnecting pattern, or to the central switching machine.

SUMMARY OF THE INVENTION

In accordance with the teaching of my invention, in situations where two stations are separated by large distances, each station would have associated therewith a line circuit such as the type shown in U.S. Pat. No. 3,436,488, issued to R. E. Barbato and D. T. Davis on Apr. 1, 1969. An off-premises line circuit is arranged to monitor the lamp ("L") lead and station activity status ("A") lead signals from each telephone station. The off-premises circuit is individually associated with a particular one of the telephone stations and works in conjunction with and in parallel with the individually associated line circuit.

In operation, the paired off-premises line circuits communicate with each other over a signaling pair of leads to control the line circuit at the "other" location. Each off-premises circuit is arranged to determine the status of the associated telephone station by monitoring only the "L" and "A" leads from that station and to communicate that status over the signaling pair of leads to the off-premises line circuit associated with the paired station. In addition, each off-premises circuit controls the lamp and hold functions at the associated station in response to signals received from the remote off-premises line circuit.

Accordingly, it is one feature of my invention to provide a circuit for determining the status of an associated telephone station and for communicating that determined status to a paired remote circuit associated with a remote station for the purpose of controlling the status of the remote station.

It is a further feature of my invention to provide a telephone status control circuit which operates in parallel with the line circuit and under control of signals present on the lamp ("L") and station activity status ("A") leads from the associated station in order to obviate changes to the existing telephone switching network, while at the same time serving to control the status of the associated station.

BRIEF DESCRIPTION OF THE DRAWING

These and other objects and features of my invention will be more apparent from a review of the drawing in which.

GENERAL DESCRIPTION

Figure 1:
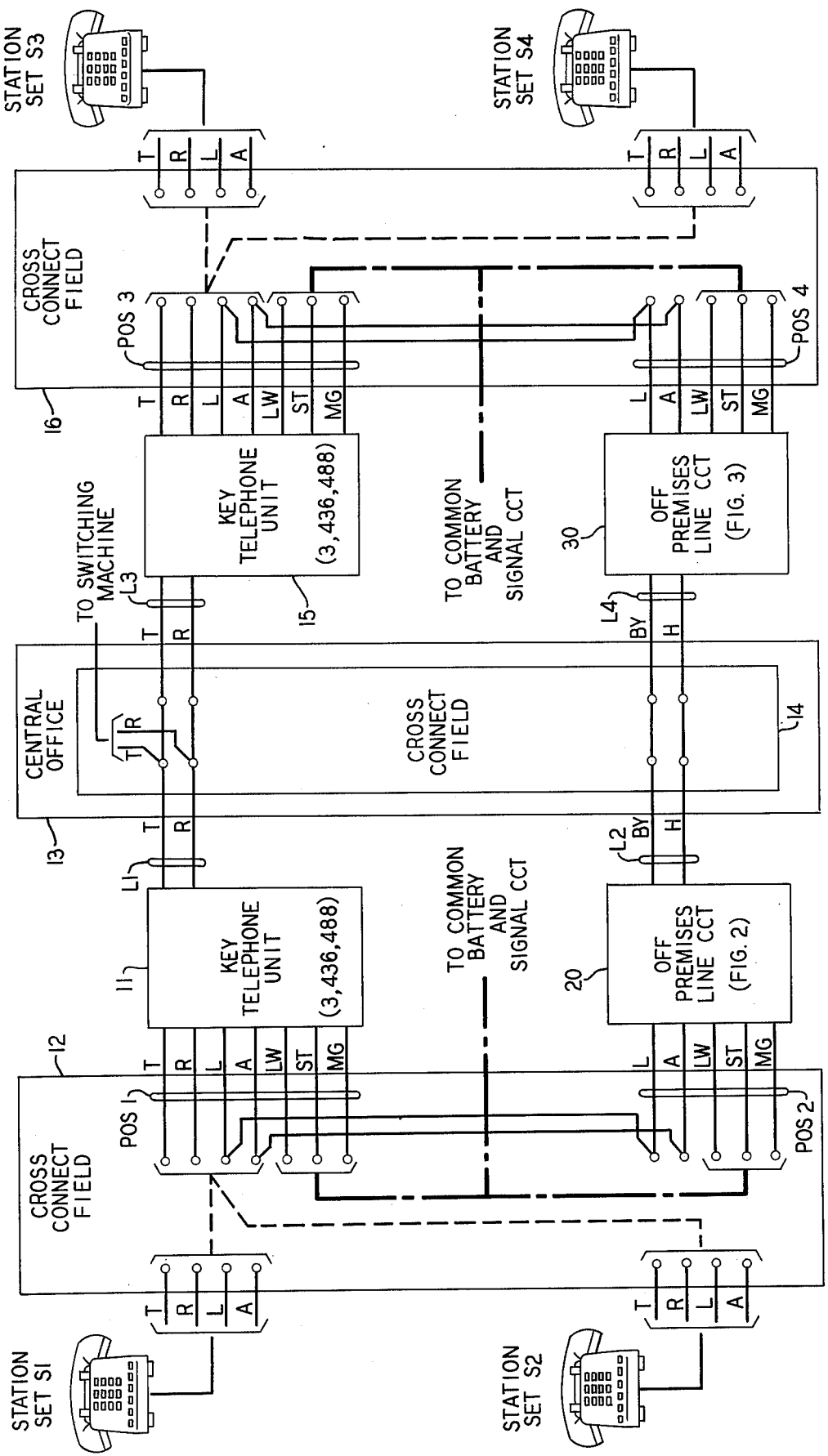
FIG. 1 is a block diagram showing the interrelationship of the various components of my invention.

As shown in FIG. 1, station sets S1 and S2 are located at a local location while station sets S3 and S4 are located at a remote location. In a typical key telephone installation, key telephone unit 11 would be serially inserted in the T and R connection between central office 13 and station set S1, for the purpose of controlling the lamp flash, ringing signals, and hold function with respect to station set S1. In situations where more than one station set, such as station set S2, is connected to the same line, a cross-connection would be established at cross-connect field 12 between station set S2 and key telephone unit 11.

In actual practice the key telephone system is arranged with terminal positions for each key telephone unit, which units are arranged as plug-in modules or boards, which boards may be removed for servicing and replaced by similar interchangeable key telephone boards. Thus, while the T and R leads of line L1 are shown in FIG. 1 as extending from central office 13 directly to key telephone unit 11, this arrangement is for illustrative purposes only and in actual fact the T and R leads of line L1 terminate at cross-connect field 12 and are cross-connected to one of the key telephone unit positions into which the plug-in board containing the key telephone unit, such as key telephone unit 11, can be inserted. Also connected to each such key telephone unit position are leads, such as MG, ST and LW, which are extended from a common battery and signal circuit (not shown). The T, R, L and A leads from any key telephone unit position are cross-connectable to any station set to which the incoming line associated therewith is connected. Thus, as shown in FIG. 1, station sets S1 and S2 are cross-connected to the key telephone unit position associated with the same telephone line, namely, line L1. Thus, key telephone unit 11 controls communication between line L1 and station sets S1 and S2.

As discussed previously and as will be more fully detailed hereinafter, key telephone unit 11 provides lamp signals over lead L to the associated station sets S1 and S2 for the purpose of informing the subscriber at those station sets of the status of line L1. In a typical installation, all stations associated with line L1 would be cross-connected via cross-connect field 12 to key telephone unit 11. However, in situations such as shown in FIG. 1 where station set S3 is located at a distance greater than that which will allow control of station S3 lamps from key telephone unit 11, simply cross-connecting station set S3 to key telephone unit 11 is not feasible.

As shown in FIG. 1, an alternate arrangement has been provided where station set S3 is connected via cross-connect field 16 to key telephone unit 15, located physically near station set S3. Key telephone unit 15 is associated with line L3, which line is extended to central office 13 and cross-connected thereat via cross-connect field 14 to line L1. Thus, lines L1 and L3 are in essence the same T and R lead pair, each extended from central office 13 in a different direction and each terminating in separate key telephone units.

Also shown in FIG. 1 are off-premises line circuits 20 and 30, each associated with one of the key telephone units 11 and 15. Thus, off-premises line circuit 20 which is connector compatible with key telephone unit 11 is inserted in a vacant key telephone position at cross-connect field 12. By so doing, the MG, ST and LW leads of off-premises line circuit 20 are automatically connected to the common leads from the common battery and signaling circuit (not shown) associated with all of the key telephone positions at cross-connect field 12. The BY and H leads from off-premises line circuit 20 upon insertion in any key telephone position are arranged to become connected to the central office line associated with that position, which in the case of off-premises line circuit 20 is line L2. Cross-connections are then established from the L and A leads of off-premises line circuit 20 to the L and A leads of the key telephone unit associated with local station S1. The cross-connections to the L and A leads can also be made from off-premises line circuit 20 directly to station S1.

In similar manner, off-premises line circuit 30 is inserted in a vacant key telephone position of cross-connect field 16. The L and A leads from off-premises line circuit 30 are cross-connected to the L and A leads of key telephone unit 15 associated with remote station set S3. The BY and H leads from off-premises line circuit 30 become associated with the line L4, which line is connected via cross-connect field 14 at central office 13 to line 12. Line 12 in turn is associated with the BY and H leads from off-premises line circuit 20 and, thus, the two off-premises line circuits are paired, each being associated with an individual one of the remote locations. The interconnection between off-premises line circuits allows signaling to pass between these circuits for the purpose of controlling the respective key telephone units in a manner to be more fully described hereinafter.

KEY TELEPHONE SYSTEM OPERATION — IN GENERAL

Prior to beginning a detailed discussion of the operation of off-premises line circuit 20, it would seem worthwhile to review briefly the operation of a typical key telephone system and particularly the operation of key telephone line circuit 11, which line circuit can be advantageously arranged as shown in the Barbato et al patent referred to hereinbefore. In such an arrangement, when a telephone station such as telephone station S1 goes off-hook, after the line pickup key associated with key telephone line circuit 11 is pressed, its network (which includes the speech transducing network and the dialing network, not shown) is connected across the T and R leads to key telephone line circuit 11. When telephone station S1 goes off-hook, a ground is also provided over the A lead, which ground is extended directly to key telephone line circuit 11. Apparatus (not shown) in key telephone line circuit 11 operates in response to ground on the A lead and current flowing from the central office or PBX on the T and R leads to establish a connection from telephone station S1 to the central office or PBX over the T and R leads of line L1. Lamp signals indicating the status of the connection are extended from key telephone line circuit 11 over the L lead to the associated telephone stations. When the subscriber at station S1 desires to place an active communication connection in the hold or inactive communicating condition, the hold button thereat is operated. Operation of the hold button removes ground from the A lead and thereafter causes the line pickup key to release. Line circuit 11 detects the absence of the A lead ground and the momentary continuation of current flowing over the T and R leads from the station and places a hold bridge across the T and R leads of line L1. When line circuit 11 goes into the hold mode, lamp wink signals are supplied, over lead L, to the associated stations as a visual indication of the hold status of the line. When the line pickup key at any station connected to line circuit 11 is operated and that station goes off-hook, ground on the A lead causes the hold bridge to be removed and a steady lamp signal to be communicated over lead L to the associated stations.

DETAILED DESCRIPTION

Figure 2:
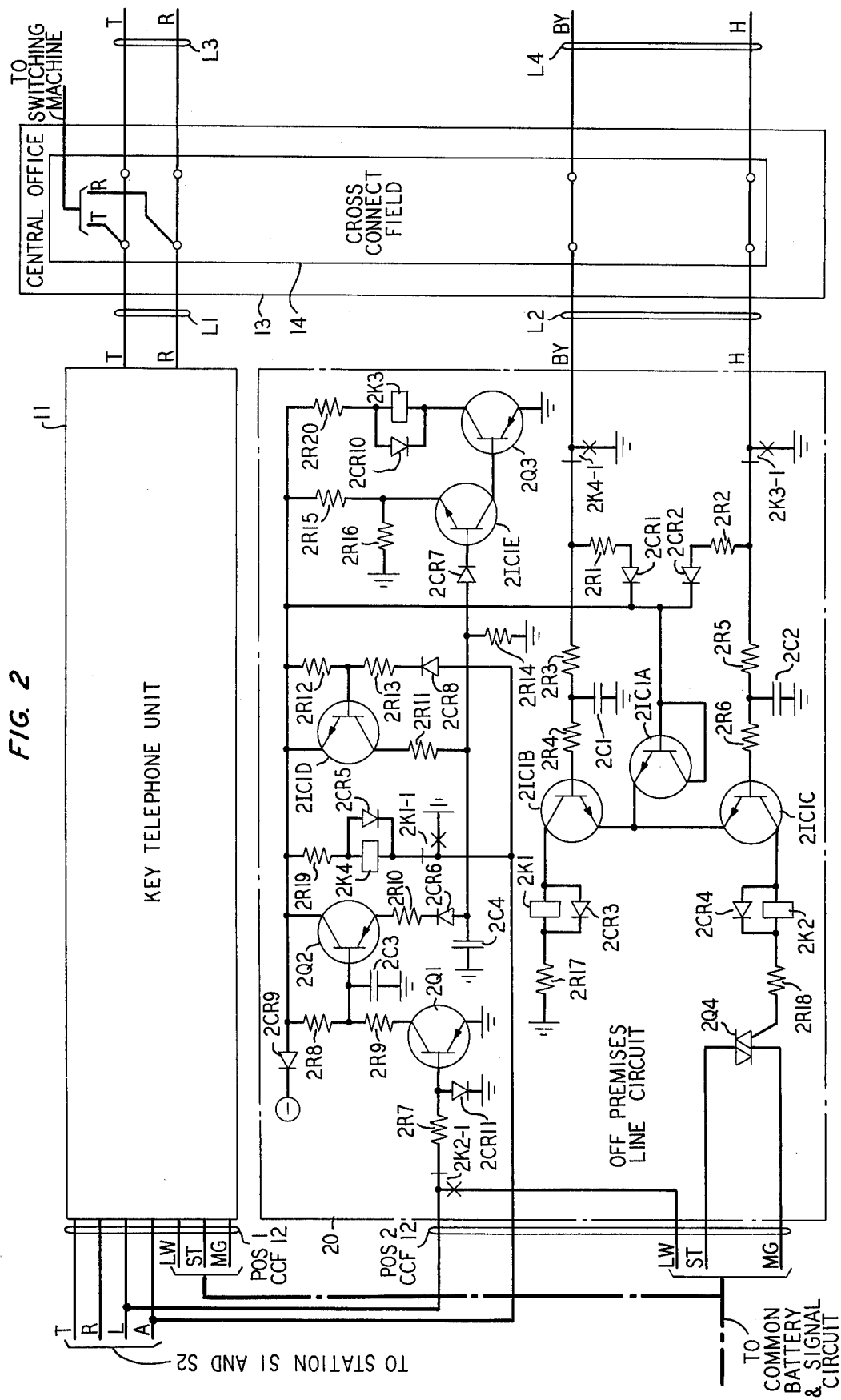
FIGS. 2 and 3 show the circuit details of the off-premises line circuit.
Figure 3:
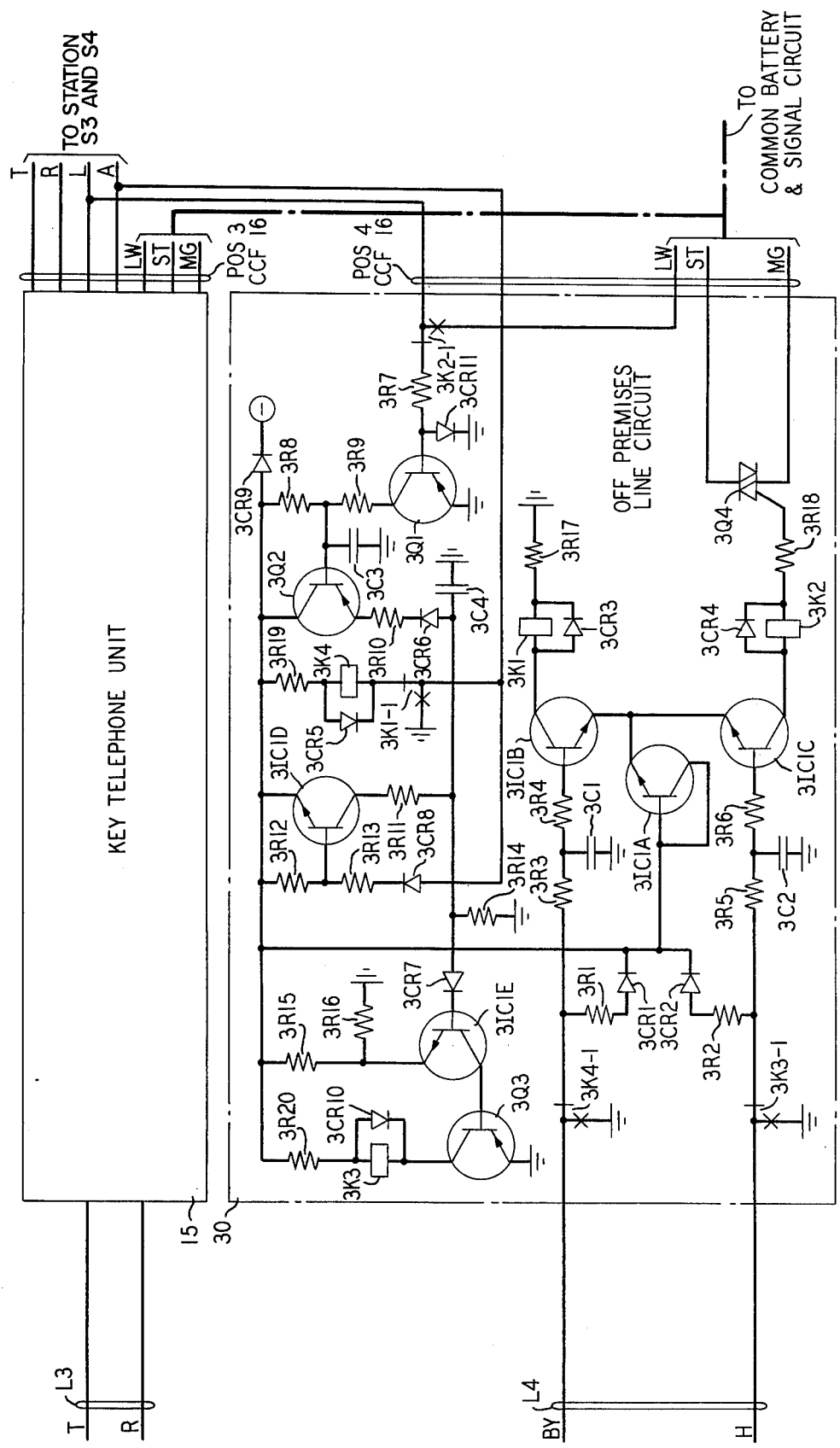

Turn now to FIGS. 2 and 3, which for purposes of discussion should be arranged side by side with FIG. 3 to the right of FIG. 2.

Incoming ringing signals which are applied to lines L1 and L3 from central office 13 are detected by the respective key telephone units 11 and 15 in the manner discussed in the above-identified Barbato et al patent. When the incoming call is answered at either location, ground is applied by the answering station to the A lead and the key telephone unit associated with the answering station operates to terminate ringing in a straightforward manner.

Assuming station S1 goes off-hook, either in response to an incoming call or to place a call, ground is applied to the A lead and is extended via cross-connect field 12 to the A lead of line circuit 11 to cause that circuit to go into the busy state. This ground is also extended to off-premises line circuit 20 and via released transfer contact 2K1-1 to one side of the winding of relay 2K4. The other side of the relay winding is connected to negative battery via resistor 2R19 and forward-biased diode 2CR9. Accordingly, relay 2K4 operates when station S1 goes off-hook.

The operation of relay 2K4 applies ground to lead BY of line L2 via now enabled transfer contact 2K4-1. This ground is extended over lead BY of line L2 to central office 13 and via cross-connect field 14 and the BY lead of line L4 to remote off-premises line circuit 30 shown in FIG. 3, and via released transfer contact 3K4-1 and resistors 3R3 and 3R4 to the base of transistor 3IC1B, thereby turning on transistor 3IC1B and operating relay 3K1. Transistor 3IC1B turns on due to the negative potential supplied via forward-biased diode 3CR9 and transistor 3IC1A, which transistor provides a threshold of approximately eight volts by virtue of the reverse emitter base junction to protect against leakage in the cable pair and differences in ground potential between station locations. Resistor 3R3 in conjunction with capacitor 3C1 and resistor 3R5 in conjunction with capacitor 3C2 operate to filter unwanted, induced, longitudinal voltages, such as 60-cycles and harmonics and lightning surges, to prevent the false turning on of transistors 3IC1B and 3IC1C. Resistor 3R1 in conjunction with diode 3CR1 and resistor 3R2 in conjunction with diode 3CR2 are arranged to prevent operation of the associated off-premises line circuit in the event of a power failure in the other connected off-premises line circuit. Resistors 3R1 and 3R2 limit the current drawn from the power supply when the far end signaling leads are grounded. Resistors 3R1 and 3R2 act as voltage dividers with the signaling path resistance (0 to 2500 ohms) and/or the leakage resistance such that maximum signaling path resistance (2500 ohms) will overcome the threshold and turn on either transistor 3IC1B or transistor 3IC1C when the far end is grounded, but leakage resistance to ground as low as 10K ohms will not turn on the respective transistor when the far end circuit is ungrounded or disconnected.

When relay 3K1 operates because of ground supplied on lead BY, off-premises line circuit 30 supplies ground on the A lead to the associated station via enabled transfer contact 3K1-1. Ground on the A lead to the associated station S3 causes the line lamp at station S3 to become illuminated in a steady manner, thereby indicating that the associated line is busy in the off-hook active mode. Thus, at this point, station S1 and station S2 being connected to the same line have their associated line lamps operated in a steady fashion under control of key telephone unit 11 at the local end while the remote end locations, station S3 and station S4, have their associated line lamps operated in a steady fashion under control of remote off-premises line circuit 30. It should be noted that, since both off-premises line circuits 20 and 30 are identical circuits, the operation would be the same if station S3 (or station S4) went off-hook to initiate or respond to a call. Under such a condition, off-premises line circuit 30 would transmit ground via its then enabled 3K4 relay over lead BY of line L4 and via central office cross-connect field 14 and over lead BY of line L2 to the other off-premises line circuit 20, thereby turning on transistor 2IC1B and relay 2K1. Relay 2K1 would then supply ground via enabled transfer contact 2K1-1 over the A lead to stations S1 and S2.

CONTROL OF THE HOLD FUNCTION

In the event that the hold button is operated at the assumed active communicating station S1, key telephone unit 11 would operate, as discussed above, to place an impedance bridge across the T and R leads to the central office, thereby placing the communication connection in an active noncommunicating mode. Operation of the hold key at station S1 causes ground to be removed from the A lead to key telephone unit 11 and lamp wink signals are applied via key telephone unit 11 over the L lead to stations S1 and S2. Lamp wink signals are defined as either continuously ON voltage signals or as high duty-cycle voltage signals providing a lamp ON time of approximately one-half second and a lamp OFF time of 50 milliseconds, while lamp flash signals are defined as even-duty cycle voltage signals providing a lamp ON time approximately equal to the lamp OFF time. Thus, the A and L leads to the off-premises line circuit 20 have a unique combination of wink potential on lead L and an ungrounded condition on lead A. This is the hold mode and the only similar mode is the ringing mode where the L lead has flashing signals thereon and the A lead is ungrounded. The off-premises line circuit is arranged to discriminate between lamp wink and lamp flash on lead L and to combine a determined lamp wink signal with the ungrounded condition of lead A to place off-premises line circuit 20 in the hold mode with its 2K3 relay operated.

The discriminating circuit of off-premises circuit 20 operates from negative one-half cycles of lamp voltage on lead L which is extended via released transfer contact 2K2-1 and resistor 2R7 to the base of transistor 2Q1, which transistor turns on and off in response to the negative one-half cycles of lamp wink potential. Transistor 2Q1 turning on discharges capacitor 2C3 which had been charged to the supply voltage through resistor 2R8 and diode 2CR9. When capacitor 2C3 discharges, transistor 2Q2 turns off allowing capacitor 2C4 to discharge through resistor 2R14 at a slow rate. Capacitor 2C4 has a charge path from negative supply voltage via diode 2CR9, turned on transistor 2Q2, resistor 2R10 and diode 2CR6. Capacitor 2C4 has another charge path via resistor 2R11 and turned-on transistor 2IC1D. Since the base of transistor 2IC1D is connected, via resistor 2R13 and diode 2CR8, to the A lead, that transistor is turned on whenever ground is applied to lead A. Thus, capacitor 2C4 may only discharge when both charge paths are not operated, i.e., when the A lead is ungrounded (hold or on-hook condition) and when transistor 2Q2 is turned off. If transistor 2Q2 were to have a pulse rate or duty cycle where its OFF time is substantially equal to its ON time, as would be the case if lamp flashing signals were on the L lead, capacitor 2C4 would not discharge sufficiently to remove the back bias from diode 2CR7 and transistor 2IC1E would remain off, thereby preventing transistor 2Q3 from turning on. This in turn would prevent relay 2K3 from operating.

If, on the other hand, as is the case with lamp wink signals, transistor 2Q2 turns on and off in a manner such that its OFF time is long (or steady) as compared to its ON time, capacitor 2C4 discharges slowly over a few cycles thereby allowing the voltage at the junction of resistor 2R14 and diode 2CR7 to become positive enough to forward bias the base emitter junction of transistor 2IC1E, thereby causing transistor 2IC1E to turn on, turning on transistor 2Q3 and operating relay 2K3. This condition continues as long as the A lead remains ungrounded and lamp hold signals are present on the L lead. During this period ground is provided via enabled transfer contact 2K3-1 over lead H of line L2 and via central office 13 to lead H of line L4 to the remote off-premises line circuit 30, FIG. 3, thereby turning on transistor 3IC1C which in turn turns on relay 3K2. Relay 3K2 has its winding connected via resistor 3R18 to the control lead of triac 3Q4. Triac 3Q4 operates to turn on the mechanical interrupter at the remote location via leads St and MG. The interrupter turning on provides lamp wink signals over lead LW, which signals are then extended via enabled transfer contact 3K2-1 and over lead L to the connected stations S3 and S4. Accordingly, upon detection of the hold condition on station S1, the lamps associated with the same line at the remote stations S2 and S3 are pulsed at the lamp wink rate as an indication that the associated line is in the hold condition.

REMOVING THE STATIONS FROM THE HOLD MODE

In the event that the subscriber at any station, S1, S2, S3 or S4, desires to communicate on the line which is now on hold, the pickup key associated with line L1 is operated. Assuming that the pickup key at station S3 is operated and station S3 goes off-hook, then ground is provided from station S3 to lead A (FIG. 3) which ground causes the operation of relay 3K4 in the manner previously described for relay 2K4, thereby supplying ground over lead BY of line L4 via enabled make contact 3K4-1 and through central office 13 and over lead BY of line L2 through released transfer contact 2K4-1, (FIG. 2), resistors 2R3 and 2R4 to turn on transistor 2IC1B, thereby turning on relay 2K1. Relay 2K1 operating provides ground to the A lead via enabled make contact 2K1-1, which ground serves to remove key telephone unit 11 from the hold mode in the same manner as if station S1 operated its pickup key and went off-hook.

Ground via enabled make contact 2K1-1 also serves to turn on transistor 2IC1D thereby providing negative potential at the junction of resistor 2R14 and diode 2CR7, turning off transistor 2IC1E which in turn turns off transistor 2Q3 and relay 2K3. Thus, the local end hold detector is deactivated by the off-hook status of the remote end.

At the remote end (FIG. 3), lamp wink signals are removed from lead L by the operation of transfer contact 3K2-1.

Thus it can be seen that a station at either the local or remote locations may place a call on hold and remove the call from hold without regard as to whether that station actually placed the call in the hold mode. This can be seen since, as discussed above, the hold detector of off-premises line circuit 20 operated to place the system in the hold mode while the circuitry associated with off-premises line circuit 30 operated in response to a grounded A lead from station S3 to remove the system from the hold mode.

CONCLUSION

Although the inventive concept has been illustrated in a key telephone system having two stations at the local end and two stations at the remote end, it should be understood that any number of stations can be connected at either location and that there can also be several distinct remote locations where telephone stations may be connected to an off-premises line circuit, each such off-premises line circuit being interconnected together either at a common location or otherwise.

Also, it should be obvious that the designations "local" and "remote" are arbitrary designations and that the arrangement of my invention is fully symmetrical. It should also be obvious to one skilled in the art that the off-premises line circuit of my invention need not be located at the same premises as the associated station, but may be located at any location within lamp range and that under some circumstances it may be useful to use my invention in situations where the local and remote stations are proximately close to each other.

What is claimed is:

1. In a telephone system where lamp signals are provided to a telephone station indicative of busy and hold conditions with respect to an associated telephone line under control of a line circuit interposed between said telephone station and a central switching machine, wherein said line circuit provides said lamp signals over an "L" lead between said line circuit and said station and wherein said line circuit obtains active and inactive status signals over an "A" lead between said line circuit and said station, each said line circuit arranged to place an associated telephone line in the hold condition, the improvement comprising means for locating two telephone stations and two line circuits at locations remote from each other, each said telephone station associated with a different one of said line circuits and each said line circuit associated with the same telephone line, said locating means including a first auxiliary circuit associated with one of said line circuits and a second auxiliary circuit associated with the other of said line circuits, said auxiliary circuits interconnected by a signaling connection and each auxiliary circuit comprising means for monitoring said associated "A" and "L" leads to detect the busy and hold status conditions of said associated station, means for communicating to the other of said auxiliary circuits over said signaling connection signals representative of any said detected busy and hold status conditions, means responsive to a communicated hold status signal over said signaling connection from the other of said auxiliary circuits for providing a hold lamp signal indication to said associated station, and means responsive to a communicated busy status signal over said signaling connection from the other of said auxiliary circuits for providing a busy lamp signal indication to said associated station.

2. The invention set forth in claim 1 wherein each auxiliary circuit further includes means responsive to a received communicated busy status signal over said signaling connection from the other of said auxiliary circuits for removing the hold lamp signal indication to said associated station.

3. The invention set forth in claim 2 wherein said hold status detecting means is enabled in response to a hold signal voltage applied to said "L" lead concurrently with an inactive status signal voltage applied to said "A" lead.

4. The invention set forth in claim 3 wherein said hold status signal voltage is a pulsating voltage having a high on-to-off duty cycle, and wherein said determining means comprises means for distinguishing said hold signal pulsating voltage from other pulsating voltages having approximately an even on-to-off duty cycle.

5. In a telephone system:
a first telephone station,
a central switching network,
a first line circuit interposed between said central switching network and said first telephone station, means in said first line circuit for detecting a hold request from said first station and for providing lamp hold signals to said first station in response to a detected hold request therefrom, a second telephone station, a second line circuit interposed between said central switching network and said second telephone station, means in said second line circuit for detecting a hold request from said second station and for providing lamp hold signals to said second station in response to a detected hold request, means consisting of a telephone line interconnecting said first line circuit, said second line circuit, and said central switching network, a first off-premises line circuit associated with said first station, a second off-premises line circuit associated with said second station, means in each said off-premises line circuit operable under joint control of provided lamp hold signals and other telephone station status and control signals from said associated station for communicating a hold signal to the other of said off-premises line circuits, means in each said off-premises line circuit operable upon receipt of said hold signal from the other of said off-premises line circuits for providing a lamp hold signal to said associated station, and a hold signal communicating means interconnecting said first off-premise line circuit and said second off-premises line circuit.

6. The invention set forth in claim 5 wherein each said off-premises line circuit further includes means responsive to a hold release signal from said associated station for providing a busy signal to the other of said off-premises line circuits, and means in each off-premises line circuit operable upon receipt of said busy signal from the other of said off-premises line circuits for controlling the provision of a lamp busy signal to said associated station.

7. The invention set forth in claim 6 wherein said controlling means in each off-premises line circuit includes means for providing a hold release signal to the line circuit associated therewith.

8. The invention set forth in claim 5 wherein said hold signal communicating means includes:

a first telephone line extending from said first off-premises line circuit to said central switching network and a second telephone line extending from said central switching network to said second off-premises line circuit, and means for interconnecting said first and second telephone lines, to become the same telephone line, at said central switching network.

9. The invention set forth in claim 5 further comprising:

a third telephone line extending from said central switching network to said first line circuit, a fourth telephone line extending from said central switching network to said second line circuit, and means for interconnecting said third and fourth telephone line, to become the same telephone line, at said central switching network.

10. The invention set forth in claim 5 wherein said first off-premises line circuit is connected to said first telephone station in parallel with said first line circuit, and said second off-premises line circuit is connected to said second telephone station in parallel with said second line circuit.

11. An off-premises line circuit for use in a telephone system where lamp signals are provided to a telephone station indicative of busy and hold conditions with respect to an associated telephone line under control of a line circuit interposed between said telephone station and a central switching machine, wherein said line circuit provides said lamp signals over an "L" lead between said line circuit and said station and wherein said line circuit obtains active and inactive status signals over an "A" lead between said line circuit and said station, each said line circuit arranged to place an associated telephone line in the hold condition; said off-premises line circuit adapted for locating two telephone stations at locations remote from each other, each said telephone station associated with a different one of said line circuits and each said line circuit associated with the same telephone line, and one said off-premises line circuit associated with each said key telephone station; said off-premises line circuit comprising means for interconnecting with another off-premises line circuit over a signaling pair of leads, means for monitoring said associated "A" and "L" leads to detect the busy and hold status conditions of said associated station, means for communicating to an interconnected other one of said off-premises line circuits over said signaling connection signals representative of any said detected busy and hold status conditions, means responsive to a communicated hold status signal over said signaling connection from the other of said off-premises line circuits for providing a hold lamp signal indication to said associated station, and means responsive to a communicated busy status signal over said signaling connection from the other of said off-premises line circuits for providing a busy lamp signal indication to said associated station.

12. The invention set forth in claim 11 wherein each off-premises line circuit further includes means responsive to a received communicated busy status signal over said signaling connection from the other of said off-premises line circuits for removing the hold lamp signal indication to said associated station.

* * * * *